United States Patent [19]
Shirley

[11] Patent Number: 5,811,826
[45] Date of Patent: Sep. 22, 1998

[54] METHODS AND APPARATUS FOR REMOTELY SENSING THE ORIENTATION OF AN OBJECT

[75] Inventor: Lyle G. Shirley, Boxboro, Mass.

[73] Assignee: Massachusetts Institute of Technology, Cambridge, Mass.

[21] Appl. No.: 797,530

[22] Filed: Feb. 7, 1997

Related U.S. Application Data

[60] Provisional application No. 60/011,287 Feb. 7, 1996.

[51] Int. Cl.$^6$ .................................................. G01N 21/86
[52] U.S. Cl. ...................................... 250/559.29; 356/375
[58] Field of Search ........................... 250/559.29, 559.3, 250/559.37; 356/28, 27, 28.5, 375; 73/861.06; 364/604, 728.03, 728.06

[56] References Cited

U.S. PATENT DOCUMENTS

| | | | |
|---|---|---|---|
| 3,661,465 | 5/1972 | Groh | 356/375 |
| 4,139,304 | 2/1979 | Redman et al. | 356/358 |
| 4,311,383 | 1/1982 | Ohtsubo | 356/28.5 |
| 4,781,455 | 11/1988 | Mächler et al. | 356/34 |
| 4,832,489 | 5/1989 | Wyant et al. | 356/359 |
| 4,912,519 | 3/1990 | Yoshida et al. | 356/28 |
| 5,455,670 | 10/1995 | Payne et al. | 356/5.1 |

FOREIGN PATENT DOCUMENTS

| | | |
|---|---|---|
| 2554086 | 6/1977 | Germany . |
| 58-173412 | 10/1983 | Japan . |
| 61-198009 | 9/1986 | Japan . |
| 2142427 | 1/1985 | United Kingdom . |

OTHER PUBLICATIONS

Butters, Von J. N., "Using the Laser to Measure Length," *Materialprüf*, 24:245–248 (Jul. 7, 1982) (German Abstract).
Zou et al., "Two–Wavelength DSPI Surface Contouring Through the Temperature Modulation of a Laser Diode," *Optik*, 94(4):155–158 (1993), Jan. 1993.
Peng et al., "Simplified Multi–Wavelength ESPI Contouring Technique Based on a Diode Laser System," *Optik*, 91(2)81–85 (1992), Jan. 1992.
Fercher et al., "Two–Wavelength Speckle Interferometric Technique for Rough Face Contour Measurement," *Optical Engineering*, 25(5):623–626 (May 1986).

(List continued on next page.)

*Primary Examiner*—Que Le
*Attorney, Agent, or Firm*—Testa, Hurwitz & Thibeault, LLP

[57] ABSTRACT

A method and apparatus for remotely sensing the orientation of an object takes advantage of the fact that, for flat surfaces, a change in radiation frequency illuminating the object produces a global translation at the detector plane of the speckle pattern reflected from the object. An object is illuminated with radiation of two different frequencies and the corresponding speckle patterns are compared to determine the magnitude and direction of shift from the first speckle pattern to the second. The magnitude and direction of the speckle pattern shift indicates the orientation of the object.

19 Claims, 4 Drawing Sheets

OTHER PUBLICATIONS

Fercher et al., "Rough Surface Interferometry with a Two–Wavelength Heterodyne Speckle Interferometer," *Applied Optics*, 24(14):2181–1288 (Jul. 15, 1985).

Thalmann et al., "Dimensional Profiling by Electronic Phase Measurement," *SPIE Industrial Laser Interferometry*, 746:61–68 (1987), Jan. 1987.

Takeda et al., "Fourier–Transform Speckle Profilometry: Three–Dimensional Shape Measurements of Diffuse Objects with Large Height Steps and/or Spatially Isolated Surfaces," *Applied Optics*, 33(34):7829–7837 (Dec. 1, 1994).

Volotovskaya, N.K., "Relationship Between the Frequency and Angular Correlation Function of a Signal that is Scattered by an Extensive Body," *Radio Engineering and Electronic Physics J*. 16(6):1048–1049 (Jun. 1971).

Dresel et al., "Three–Dimensional Sensing of Rough Surfaces by Coherence Radar," *Applied Optics*, 31(7):919–925 (Mar. 1, 1992).

Shirley et al., "Advanced Techniques for Target Discrimination Using Laser Speckle," *Massachusetts Institute of Technology, The Lincoln Laboratory J.*, 5(3):367–440 (1992), Jan. 1992.

Shirley, L. G., "Applications of Tunable Lasers to Laser Radar and 3D Imaging," *Technical Report 1025, Massachusetts Institute of Technology, Lincoln Laboratory*, (1995), Jan. 1995.

METHODS AND APPARATUS FOR REMOTELY SENSING THE ORIENTATION OF AN OBJECT

GOVERNMENT SUPPORT

This invention was made with government support under Contract number F19268-95-C-0002 awarded by the Air Force. The government has certain rights in the invention.

CROSS REFERENCE TO RELATED APPLICATIONS

This application claims priority to co-pending provisional patent application Ser. No. 60/011,287, filed Feb. 7, 1996, the entirety of which is incorporated herein by reference.

FIELD OF THE INVENTION

The present invention relates to object imaging techniques and, in particular, to methods and apparatus for remotely sensing the orientation of an object.

BACKGROUND OF THE INVENTION

Remotely sensing the orientation of an object has utility in many settings. For example, in computer-aided manufacturing processes, the ability to remotely sense the orientation of an object would allow individual parts to be oriented on an assembly line without requiring them to be forced through guides, jigs, or tracks, all of which can damage delicate parts. The ability to remotely sense orientation also has utility in the robotic vision arts. In order to guide a mobile robot around an object, it is necessary to be able to sense the object's orientation remotely so that the object can be accurately avoided.

Current object visualization techniques require visualization of the entire object. These techniques have the drawback of having burdensome computational requirements. This requires more expensive hardware to implement these techniques and limits the applications in which they can be used because of longer latency times in calculating an orientation.

SUMMARY OF THE INVENTION

The invention relates to an apparatus and related methods for remotely determining the orientation of an object using speckle-pattern sampling which can be implemented with reduced system requirements and without the use of a reference point. Radiation reflected from an object produces a speckle pattern. The measurement technique takes advantage of the fact that, for a flat or locally flat surface, a change in radiation frequency produces a global translation of the speckle pattern. The angle of incidence and the plane of incidence of the laser beam are determined from the rate and the direction of speckle translation, respectively.

In one aspect, the invention relates to a method for remotely sensing the orientation of an object by (a) receiving a first speckle pattern produced by radiation of a first frequency reflected from the object, (b) receiving a second speckle pattern produced by radiation of a second frequency reflected from the object, and (c) determining the differences between the first speckle pattern and the second speckle pattern. In some embodiments, the object may be illuminated with radiation of a first and second frequency before receiving the speckle patterns.

In another aspect, the invention relates to an apparatus for remotely sensing the orientation of an object. The apparatus includes a speckle pattern receiver which receives a first speckle pattern corresponding to radiation of a first frequency reflected from the object and a second speckle pattern corresponding to radiation of a second frequency reflected from the object. The apparatus also includes a processor in electrical communication with the speckle pattern receiver. The processor determines the differences between the first speckle pattern and the second speckle pattern. The apparatus may also include a radiation source for illuminating the object with radiation of a first and second frequency.

In another aspect, the invention relates to an apparatus for remote sensing the orientation of an object. The apparatus includes a radiation source which alternately illuminates the object with radiation at a first frequency and a second frequency. The apparatus also includes a speckle pattern receiver which receives a first speckle pattern corresponding to radiation of the first frequency reflected from the object and a second speckle pattern corresponding to radiation of the second frequency reflected from the object. The apparatus further includes a processor in electrical communication with the speckle pattern receiver which compares the first speckle pattern to the second speckle pattern to determine the direction the second speckle pattern has shifted from the first speckle pattern. The processor also determines the magnitude of any shift that occurs. In a further embodiment, the apparatus includes a lens between the speckle pattern receiver and the object. The lens is spaced apart from the speckle pattern receiver by a distance equal to the focal length of the lens.

BRIEF DESCRIPTION OF THE DRAWINGS

The invention is pointed out with particularity in the appended claims. The advantages of the invention described above, as well other advantages, may be better understood by referring to the following description taken in conjunction with the accompanying drawings, in which:

DETAILED DESCRIPTION OF THE INVENTION

While describing the embodiment of the invention, reference will be made to "sources" and "sources of radiation." These terms are meant to refer to any source of radiation, including highly localized sources of radiation.

Figure 1:
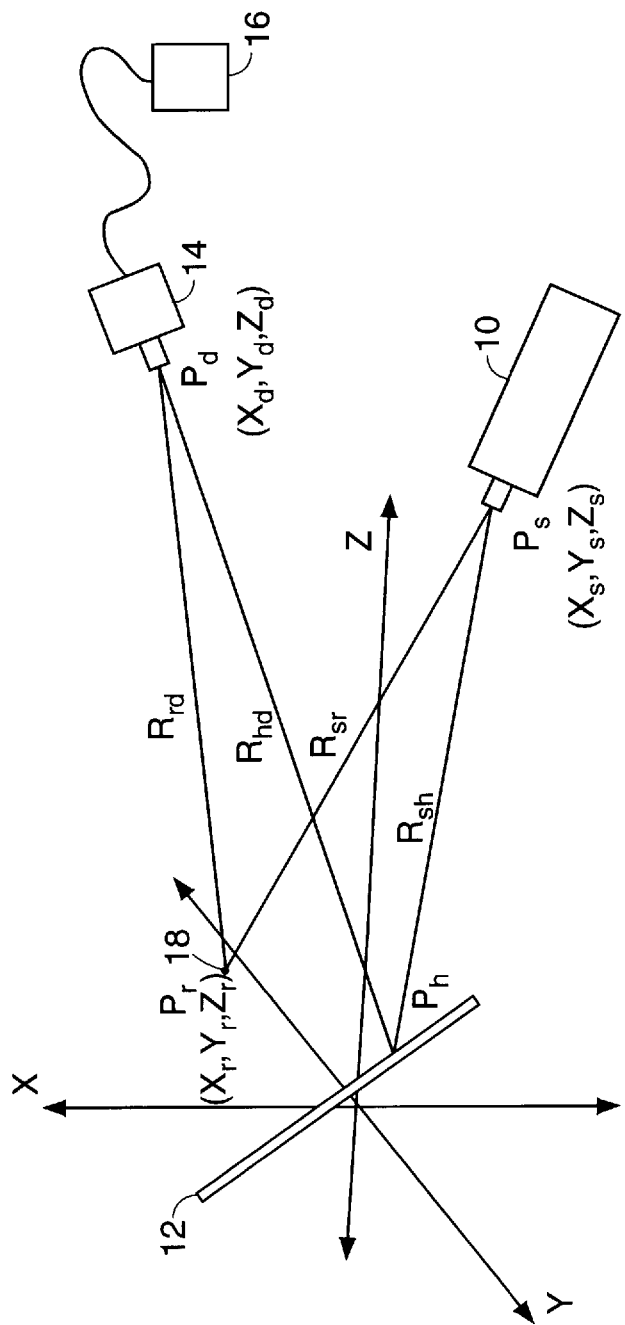
FIG. 1 is a block diagram of an embodiment of the invention for remotely sensing the orientation of an object.

Referring to FIG. 1, a point source of radiation 10, having wavelength $\lambda$ and located at spatial coordinates $(x_s, y_s, z_s)$, illuminates an object 12. The distance from the point source 10 to a representative point, $P_h$, on the surface of the object 12 is indicated as $R_{sh}$. The radiation source is generally a coherent source of radiation, e.g. a laser, although source capable of simultaneously or alternately emitting more than one frequency of radiation can be used. In some embodiments the source is a laser which is capable of emitting radiation at stepped frequencies. The source may be a laser capable of simultaneously emitting two frequencies of radiation. The source may be scannable to illuminate different regions on the object 12.

A detector 14, located at spatial coordinates ($x_d$, $y_d$, $z_d$), detects radiation scattered from the surface of the object 12. The distance from the point, $P_h$, on the surface of the object 12 to the detector 14 is indicated as $R_{hd}$. In one embodiment, the detector 14 comprises an array of photodetector elements providing a two dimensional image of the speckle pattern produced by the object 12. In a further embodiment, the array of photodetector elements is a charge coupled device (CCD). The detector 14 provides an output signal which may comprise one or more individual signals. If the detector 14 provides multiple outputs each output may be associated with a corresponding element of the detector 14. In some embodiments, more than one detector 14 may be provided. In these embodiments each detector may be tuned to receive reflected speckle patterns which correspond to one particular frequency of radiation.

A processor 16 receives output signals from the detector 14. A single processor may be provided which operates with single output detectors or the processor 16 may operate on detector output signals associated with each of the photodetector elements of an array. If multiple outputs are provided by the detector 14, the processor 16 may be provided as a multiprocessor having a plurality of individual processors and each photodetector element provides an input signal to a respective one of the processors. In yet another embodiment, in which the detector 14 is a CCD array, a plurality of the CCD elements provide an input signal to a respective processor of a multiprocessor. With the multiprocessor arrangements, computations on signals from a plurality of individual photoelements occur substantially simultaneously, thereby enhancing the signal processing speed. The processor 16 compares received speckle patterns in order to determine the orientation of the object 12. The calculations performed by the processor 16 are described in more detail below.

A reflective reference point $P_r$ 18 is located near the object at spatial coordinates ($x_r$, $y_r$, $z_r$). The distance from the reflective reference point 18 to the detector 14 is indicated as $R_{rd}$ and the distance from the reference point 18 to the point source 10 is indicated as $R_{sr}$. The intensity of the optical field at point $P_d$, $V(x_d, Y_d, Z_d;\lambda)$, is the sum of radiation scattered from each point on the surface of the object 12. For example, assuming that single scattering dominates so that light travels from $P_s$ to $P_h$ to $P_d$ without being scattered from $P_h$ to other points on the surface before reaching $P_d$, the phase delay at $P_d$ due to this propagation pathlength is obtained by adding $R_{sh}$ and $R_{hd}$ and multiplying the sum by the wavenumber, $k=2\pi/\lambda$. The resulting contribution to the optical field amplitude at $P_d$ made by radiation scattered from point $P_h$ is:

$$V_h(x_d, y_d, z_d; \lambda) = g(x_h, y_h, z_h)\exp\left[-i\frac{2\pi}{\lambda}(R_{sh}+R_{hd})\right] \quad (1)$$

where $g(x_h, y_h, z_h)$ is a complex scattering function whose magnitude represents the strength of the contribution from $P_h$ and whose phase accounts for any phase change caused by scattering. The complex amplitude $V(x_d, y_d, z_d;\lambda)$ resulting from the entire surface is obtained by summing the individual contributions from all scattering points. Because the scattering function is zero-valued at locations where there are no scattering points, this summation can be written as an integral over all space:

$$V(x_d, y_d, z_d; \lambda) = \quad (2)$$

$$\int\int_{-\infty}^{\infty}\int g(x_h, y_h, z_h)\exp\left[-i\frac{2\pi}{\lambda}(R_{sh}+R_{hd})\right]dx_h dy_h dz_h$$

where $$R_{sh}=\sqrt{(x_s-x_h)^2+(y_s-y_h)^2+(z_s-z_h)^2} \quad (3)$$

and $$R_{hd}=\sqrt{(x_h-x_d)^2+(y_h-y_d)^2+(z_h-z_d)^2} \quad (4)$$

If the height profile of the object 12 is represented by h(x, y), then the scattering function can be written in the form $$g(x,y,z)=a(x,y)\delta[z-h(x,y)] \quad (5)$$

where a(x,y) is the complex amplitude of the given contribution to $V(x_d, y_d, z_d;\lambda)$.

The complex amplitude $V_r(x_d, y_d, z_d;\lambda)$ corresponding to the reference point $P_r$ is obtained by substituting $$g(x,y,z)=g_r\delta(x-x_r)\delta(y-y_r)\delta(z-z_r) \quad (6)$$

into Eq. (2). Without loss of generality, $P_r$ can be placed at the origin of the coordinate system. Then the distances $R_{sr}$ and $R_{rd}$ in the complex exponential can be replaced by $R_s$ and $R_d$, which are the distances from $P_s$ to the origin and from the origin to $P_d$, respectively. The resulting expression for the contribution to the complex amplitude from the reference point $P_r$ is $$V_r(x_d, y_d, z_d; \lambda) = g_r\exp\left[-i\frac{2\pi}{\lambda}(R_s+R_d)\right] \quad (7)$$

The total complex amplitude at the observation point $P_d$ is the sum of V from Eq. (2) and $V_r$ from Eq. (7). The quantity measured at the observation point is the magnitude squared of this total complex amplitude:

$$I(X_d, Y_d, Z_d;\lambda)=|V_r(x_d,y_d,z_d;\lambda)+V(x_d,y_d,z_d;\lambda)|^2=I_1+I_2+I_3+I_4 \quad (8)$$

where $$I_1=|g_r|^2 \quad (9)$$

$$I_2=|V(x_d,y_d,z_d;\lambda)|^2 \quad (10)$$

$$I_3 = g^*_r\exp\left[i\frac{2\pi}{\lambda}(R_s+R_d)\right]V(x_d, y_d, z_d; \lambda) \quad (11)$$

and $$I_4=I_3^* \quad (12)$$

that is, $I_4$ equals the complex conjugate of $I_3$.

The distances given by the square roots in Eqs. (3) and (4) may be approximated. First consider the distance $R_{hd}$ between the scattering point and the observation point in Eq. (4). If $R_{hd}$ is written in the form $$R_{hd}=R_d\sqrt{1+\frac{x_h^2+y_h^2+z_h^2-2x_hx_d-2y_hy_d-2z_hz_d}{R_d^2}} \quad (13)$$

expanded in a binomial series, and the terms kept up to second order in $R_h$, where $R_h$ is the distance from the origin to the scattering point, the approximation $$R_{hd} \approx R_d - \quad (14)$$

-continued $$\frac{x_h x_d + y_h y_d + z_h z_d}{R_d} + \frac{x_h^2 + y_h^2 + z_h^2}{2R_d} - \frac{(x_h x_d + y_h y_d + z_h z_d)^2}{2R_d^3}$$

is obtained. A corresponding expression for the distance $R_{sh}$ between the source point and the scattering point is obtained by replacing the subscript d with the subscript s in Eq. (14).

The first two terms on the right side of Eq. (14) correspond to the usual far-field approximation, except that the integration is normally limited to the x-y plane so that $Z_h=0$. The combination of the first three terms can be made to look like the standard Fresnel approximation $$\sqrt{(x_h - x_d)^2 + (y_h - y_d)^2 + z_d^2} \approx z_d + \frac{(x_h - x_d)^2 + (y_h - y_d)^2}{2z_d} \quad (15)$$

by setting $Z_h=0$ and approximating $R_d$ by $z_d$ in some instances. The standard Fresnel approximation (shown in Eq. (15)) is inherently paraxial in nature, that is, valid only for small values of $x_d$ and $y_d$. The advantage of Eq. (14) is that it is equally valid for all observation directions, being a wide-angle Fresnel approximation.

Equation (14) and the corresponding expression for $R_{sh}$ can now be substituted into Eq. (2) to proceed with the evaluation of the terms $I_1-I_4$ in Eqs. (9)–(12). Rather than using the full wide-angle Fresnel approximation at this point, we begin with the far-field approximation as given by the first two terms in Eq. (14).

With the far-field assumption, Eq. (2) becomes $$V(x_d, y_d, z_d; \lambda) = \quad (16)$$

$$\exp\left[-i\frac{2\pi}{\lambda}(R_s + R_d)\right] \int\int\int_{-\infty}^{\infty} g(x_h, y_h, z_h) \times$$

$$\exp\left\{-i\frac{2\pi}{\lambda}\left[x_h\left(\frac{x_s}{R_s} + \frac{x_d}{R_d}\right) + y_h\left(\frac{y_s}{R_s} + \frac{y_d}{R_d}\right) + z_h\left(\frac{y_s}{R_s} + \frac{y_d}{R_d}\right)\right]\right\} dx_h dy_h dz_h$$

The coordinates $(x_s, y_s, z_s)$ for the source point and $(x_d, y_d, z_d)$ for the observation point occur in Eq. (16) in terms of the direction cosines $l_s=x_s/R_s$, $m_s=y_s/R_s$, $n_s=z_s/R_s$, $l_d=x_d/R_d$, $m_d=y_d/R_d$, and $n_d=z_d/R_d$. Therefore, except for the implicit dependence of g(x, y, z) on $R_s$ and $R_d$ to account for the falloff of field strength with distance, the integral in Eq. (16) is independent of observation distance $R_d$ and source-point distance $R_s$, as long as these points are in the far field. Note that the integral in Eq. (16) is the 3D Fourier transform of g(x, y, z), allowing Eq. (16) to be rewritten as $$V(x_d, y_d, z_d; \lambda) = \exp\left[-i\frac{2\pi}{\lambda}(R_s + R_d)\right] \tilde{g}(f_x, f_y, f_z) \quad (17)$$

where the tilde represents a Fourier transform and the spatial frequencies $f_x$, $f_y$, and $f_z$ are related to the direction cosines and the wavelength by $$f_x = -\frac{l_s + l_d}{\lambda}, \quad (18)$$

$$f_y = -\frac{m_s + m_d}{\lambda}, \quad (19)$$

and $$f_z = -\frac{n_s + n_d}{\lambda}, \quad (20)$$

In writing these equations note that the values of $f_x$, $f_y$, and $f_z$ are not independent; any two of the three direction cosines determines the third direction cosine through the relations $l_d^2+m_d^2+n_d^2=1$ and $l_s^2+m_s^2+n_s^2=1$. Substitution of Eq. (17) into Eqs. (10) and (11) yields $$I_2=|\tilde{g}(f_x,f_y,f_z)|^2 \quad (21)$$

and $$I_3=g_r^*\tilde{g}(f_x,f_y,f_z) \quad (22)$$

Equation (8) then takes the form $$I(x_d,y_d,z_d;\lambda)=|g_r|^2+|\tilde{g}(f_x,f_y,f_z)|^2+g_r^*\tilde{g}(f_x,f_y,f_z)+g_r\tilde{g}^*(f_x,f_y,f_z) \quad (23)$$

Figure 2B:
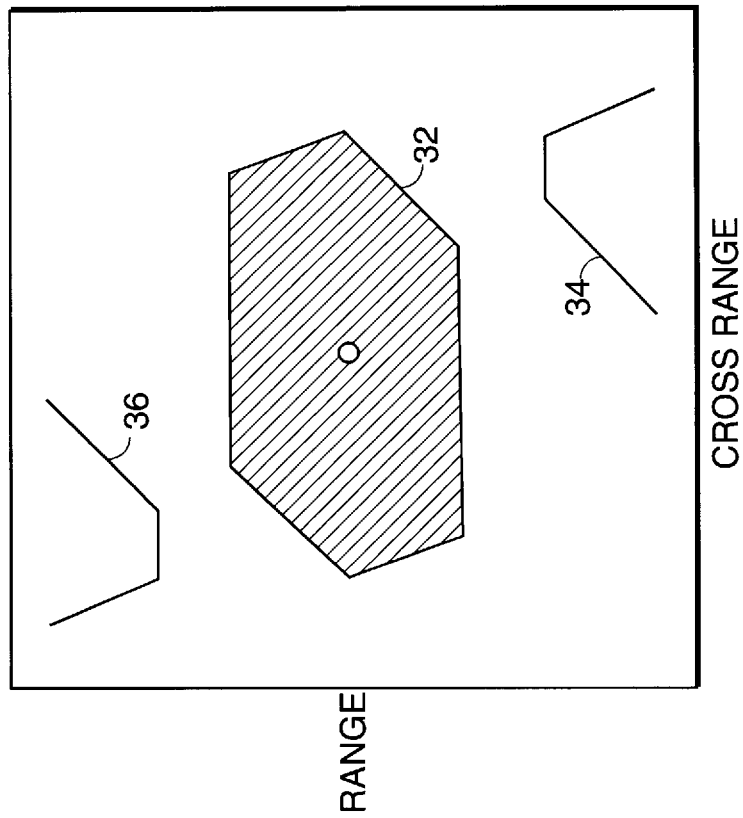
FIG. 2A and 2B are diagrammatic views of an embodiment of the invention and its corresponding frequency range representation.
Figure 2A:
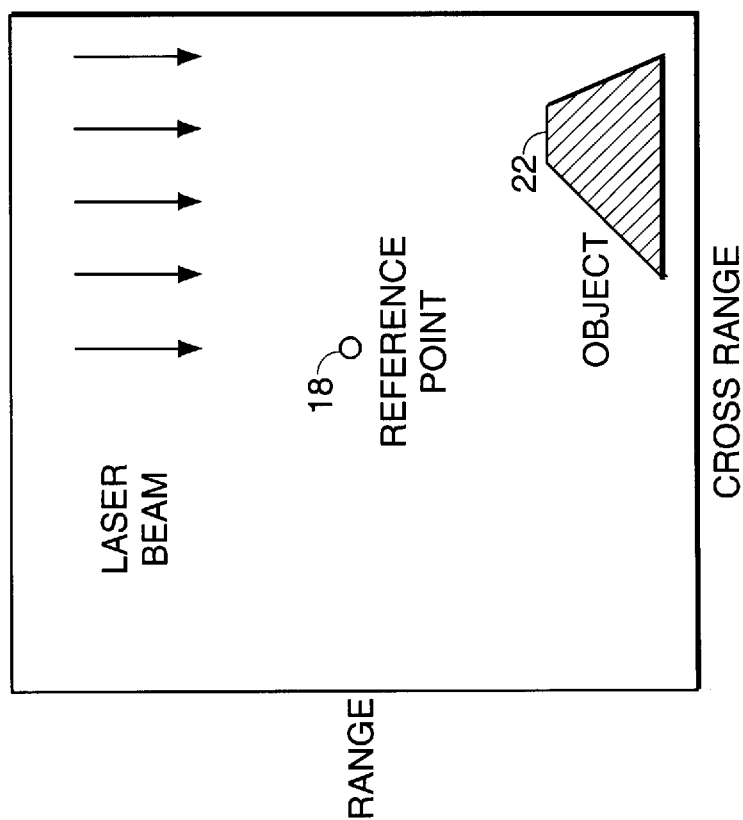

The significance of the four terms $I_1-I_4$ in Eq. (23) is explained by performing an inverse Fourier transform to convert between Fourier space and object space. The inverse Fourier transforms of the individual terms are illustrated in FIG. 2B. The scattering surface 22, shown in FIG. 2A, is located below and to the right of the reference point 18. Because $I_1$ is a constant, its inverse Fourier transform is a 3D δ-function 32 located at the origin of object space in FIG. 2B. By the autocorrelation theorem, the inverse Fourier transform of $I_2$ is the 3D autocorrelation function of g(x,y,z). The inverse Fourier transform of $I_3$ gives the desired quantity g(x,y,z) multiplied by $g_r^*$, the complex conjugate of $g_r$, which occurs in the lower right-hand quadrant and is labeled 34. Because $I_4$ is the complex conjugate of $I_3$, its inverse Fourier transform is $g_r g^*(-x,-y,-z)$. This term corresponds to the inverted image in the upper left-hand quadrant of FIG. 2B and is labeled 36. It is also possible to obtain a three-dimensional height profile of the object by this procedure, however, I ($x_d$, $y_d$, $z_d$; λ) must be sampled at many different frequencies to produce the quantity to be Fourier transformed.

The method for remotely determining orientation may be further simplified, however. The first step is to write an expression for the measured speckle intensity with no reference point by setting $g_r=0$ in Eq. (23), which leaves only the second term of the original four terms:

$$I(x_d,y_d,z_d;\lambda)=|\tilde{g}(f_x,f_y,f_z)|^2 \quad (24)$$

The inverse Fourier transform of Eq. (24) with respect to the spatial frequency variables is the autocorrelation function $$P_{AC}(x, y, z) = \quad (25)$$

$$\int\int\int_{-\infty}^{\infty} g^*(x_h, y_h, z_h)g(x + x_h, y + y_h, z + z_h)dx_h dy_h dz_h$$

of the complex scattering function.

Using Eq. (5) to write the complex scattering function in terms of the complex amplitude a(x,y) and the height profile h(x,y) and given that the laser beam illuminates the object along the negative z-axis, the height function for a flat plate can be expressed in terms of the angle of incidence $\theta_h$, which is the angle between the normal vector to the surface and the laser beam. and the azimuthal angle $\phi_h$. The azimuthal angle refers to the direction of the two-dimensional projection of the normal vector in the x-y plane.

$$h(x,y)=h_0-x\cos\phi_h\tan\theta_h-y\sin\phi_h\tan\theta_h \quad (26)$$

where $h_0$ is the height of the planar surface at $x=y=0$. The resulting expression for the autocorrelation function given by Eq. (25) is $$P_{AC}(x, y, z) = \delta(z + x\cos\phi_h\tan\theta_h + y\sin\phi_h\tan\theta_h) \times \quad (27)$$

$$\int\int_{-\infty}^{\infty} a^*(x_h, y_h)a(x + x_h, y + y_h)dx_h dy_h$$

The $\delta$-function in Eq. (27) limits the autocorrelation function to a planar region of space passing through the origin of the coordinate system and having the same orientation as the original scattering surface. Consequently, a measurement of the orientation of the scattering surface can be performed through the standard speckle pattern sampling technique but without using a reference point.

Further simplification of the necessary calculation may be achieved by eliminating the need to acquire a series of speckle frames at incremental laser-frequency shifts. This approach is based on measuring the speckle motion in the detector plane caused by varying the laser wavelength. Evaluating Eq. (24) for the planar height profile given by Eq. (26) yields:

$$|\tilde{g}(f_x,f_y,f_z)|^2 = |\tilde{a}(f_x - f_z\tan\theta_h\cos\phi_h, f_y - f_z\tan\theta_h\sin\phi_h)|^2 \quad (28)$$

Equation (28) is an expression for the speckle intensity at the detector plane in terms of spatial-frequency coordinates. It is useful for determining the effect that tuning the laser frequency has on an individual speckle lobe. Mathematically, the $f_x$ and $f_y$ coordinates of a speckle lobe are tracked by keeping the arguments of $\tilde{a}$ constant as $f_z$ is varied through changing the wavelength. Thus, for the first argument $$f_{x_1} - f_{z_1}\tan\theta_h\cos\phi_h = f_{x_2} - f_{z_2}\tan\theta_h\cos\phi_h \quad (29)$$

and for the second argument $$f_{y_1} - f_{z_1}\tan\theta_h\sin\phi_h = f_{y_2} - f_{z_2}\tan\theta_h\sin\phi_h \quad (30)$$

where the subscripts 1 and 2 denote speckle measurements at wavelengths $\lambda_1$ and $\lambda_2$, respectively. The orientation of the scattering plane can be determined by solving Eqs. (29) and (30) for $\phi_h$. In terms of the spatial-frequency differences $$\Delta f_x = f_{x_2} - f_{x_1} = \frac{l_{d_1}}{\lambda_1} - \frac{l_{d_2}}{\lambda_2} \quad (31)$$

$$\Delta f_y = f_{y_2} - f_{y_1} = \frac{m_{d_1}}{\lambda_1} - \frac{m_{d_2}}{\lambda_2} \quad (32)$$

and $$\Delta f_z = f_{z_2} - f_{z_1} = \frac{1 + \sqrt{1 - l_{d_1}^2 - m_{d_1}^2}}{\lambda_1} - \frac{1 + \sqrt{1 - l_{d_2}^2 - m_{d_2}^2}}{\lambda_2} \quad (33)$$

of a speckle lobe at the two wavelengths, these angles can be written as $$\tan\theta_h = \frac{\sqrt{\Delta f_x^2 + \Delta f_y^2}}{|\Delta f_z|} \quad (34)$$

and $$\tan\phi_h = \frac{\Delta f_y}{\Delta f_x} \quad (35)$$

Equations (34) and (35) are general results for calculating the angle of incidence $\theta_h$ and the plane of incidence $\phi_h$ given the original direction cosines ($l_{d1}$, $m_{d1}$) of a speckle lobe at wavelength $\lambda_1$ and the new direction cosines ($l_{d2}$, $m_{d2}$) that this speckle lobe takes at wavelength $\lambda_2$.

If wavelength aberration, which is image degradation caused by varying $\lambda$ during a measurement to achieve range resolution, detector-plane distortion, which is a result of sampling on a flat detector plane with constant $z_d$ value, and depth-of-field aberration, which degrades image points having large range offsets $z_h$ from the reference point, are negligible or have been corrected, Eqs. (31)–(33) can be written in terms of the location ($x_d,y_d,z_d$) of the speckle lobe on the detector plane and the frequency shift $\Delta\nu$ as $$\Delta f_x = \frac{x_{d_1} - x_{d_2}}{\lambda_0 z_d} \quad (36)$$

$$\Delta f_y = \frac{y_{d_1} - y_{d_2}}{\lambda_0 z_d} \quad (37)$$

and $$\Delta f_z = 2\left(\frac{1}{\lambda_1} - \frac{1}{\lambda_2}\right) = -2\frac{\Delta\nu}{c} \quad (38)$$

Eqs. (34) and (35) then simplify such that every speckle lobe shifts by the same amount and in the same direction in the detector plane. From Eq. (34), the magnitude of this shift is $$r_d = -2z_d \frac{\Delta\nu}{\nu_0}\tan\theta_h \quad (39)$$

and from Eq. (35), the direction of this shift is $$\phi = \phi_h \quad (40)$$

Thus, the angle of incidence $\theta_h$ and plane of incidence $\phi_h$ can be determined remotely by measuring the magnitude and direction, respectively, of the speckle shift caused by tuning the laser frequency.

To apply Eq. (39) to the determination of $\theta_h$ in practice, the detector distance $z_d$ must be known. This requirement can be circumvented, however, by placing a Fourier-transform lens in front of the detector 14. Then, $z_d$ is replaced by the focal length $f$ of the Fourier-transform lens and the measurement is insensitive to object distance. The object distance allowed by a Fourier-transform lens is limited, however, because the range of spatial frequencies accepted by the lens decreases with increasing object distance.

EXAMPLE

Figure 3:
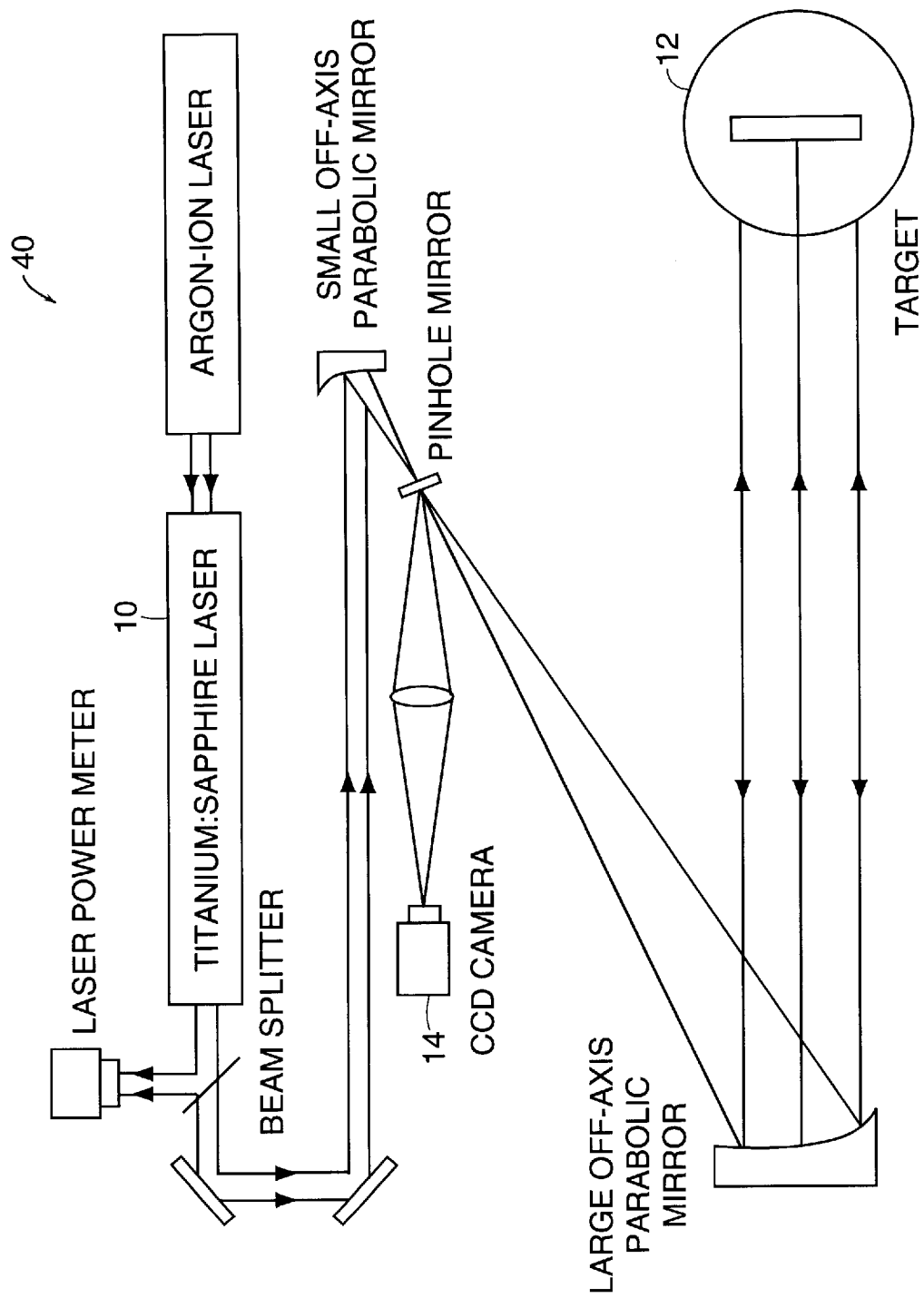
FIG. 3 is a block diagram of another embodiment of the invention.

Laboratory measurements were performed using the optical system 40 shown in FIG. 3 to verify this technique for remote sensing of angular orientation of flat surfaces. In these measurements, a flat plate 12 was mounted on a system of rotary stages that enabled control of the angle of incidence $\theta_h$ and the plane of incidence $\phi_h$ and the plate was spot illuminated with a beam from a Ti:sapphire laser 10. The general behavior predicted by Eqs. (39) and (37) was readily observed; as the laser frequency varies, the entire speckle pattern shifts in the direction $\phi_h$ with a rate that increases with increasing $\theta_h$. To make more quantitative measurements, the laser frequency was stepped by a known amount and the CCD frames acquired by a CCD camera 14 were compared at the two frequencies by calculating a 2D cross correlation of the speckle frames. Two-dimensional cross-correlation functions are well known in the art. The magnitude and the direction of offset from the origin of the cross-correlation peak provided a measurement of $r_d$ and $\phi$.

Figure 4:
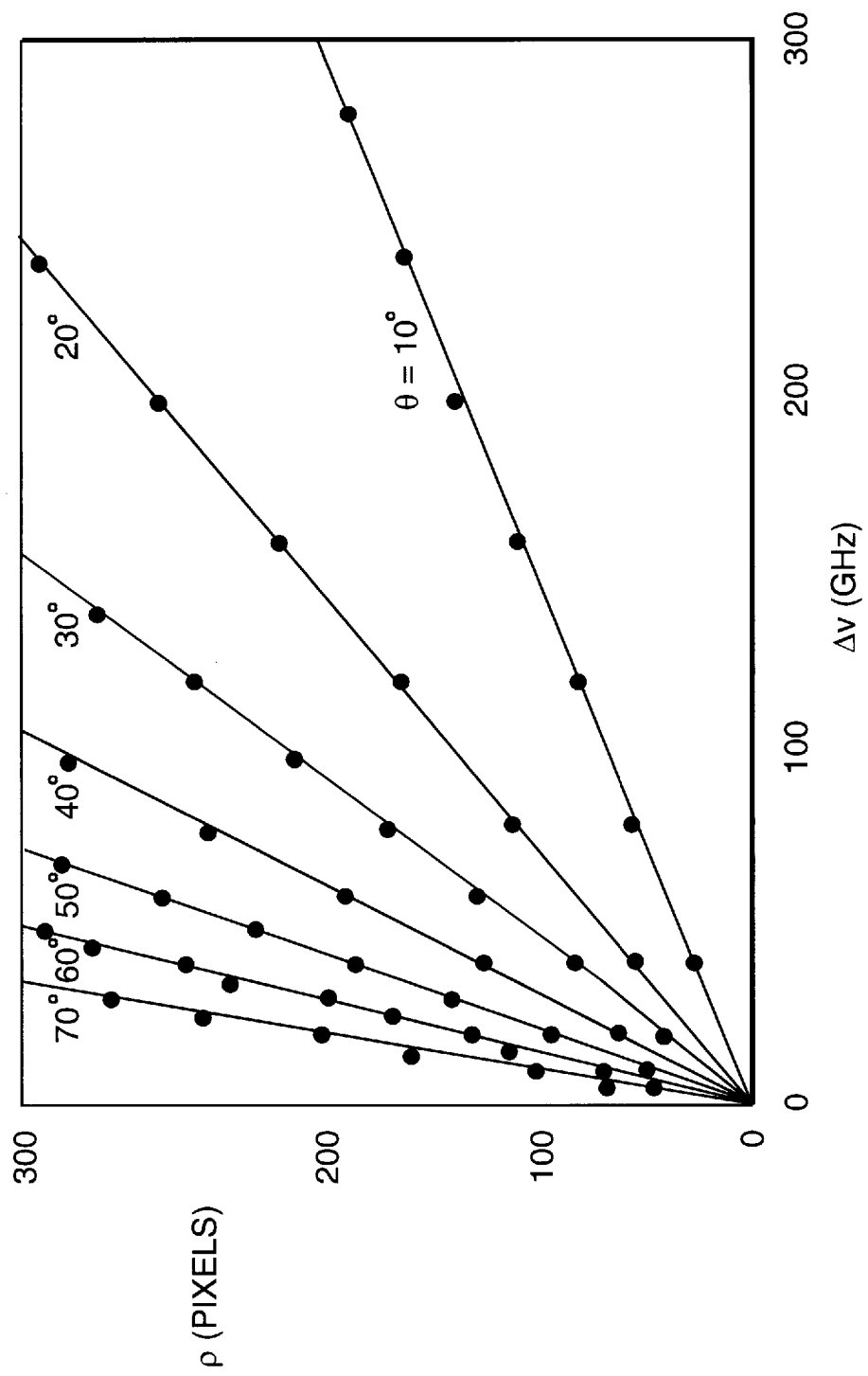
FIG. 4 is a graph showing the results of the tests performed with the embodiment shown in FIG. 3.

FIG. 4 is a family of plots of the magnitude of the speckle shift (in units of pixels $\rho$) versus laser-frequency shift $\Delta\nu$ for angles of incidence $\theta_h$ ranging between 10° and 70° in 10° increments. In this figure, the $\rho$ versus $\Delta v$ curves are straight lines and the slope of these lines is proportional to $\tan \theta_h$, as predicted by Eq. (39). A series of measurements with constant $\theta_h$ and variable $\phi_h$ was also performed. The linear relation between $\theta_h$ and $\phi_h$ predicted by Eq. (40) was confirmed in these measurements.

The method and apparatus described above may be used to determine the orientation of a non-planar object. For example, the method may be restricted to a substantially planar portion of a non-planar object. Alternatively, the method may be used on a non-planar object in its entirety. The change in speckle patterns can still be correlated to an orientation vector of the object, although the correlation function will not be known a priori.

Having described and shown the preferred embodiments of the invention, it will now become apparent to one of skill in the art that other embodiments incorporating the concepts may be used and that many variations are possible which will still be within the scope and spirit of the claimed invention. It is felt, therefore, that these embodiments should not be limited to disclosed embodiments but rather should be limited only by the spirit and scope of the following claims.

What is claimed is:

1. A method for remotely sensing the orientation of an object, the method comprising:

(a) receiving a first speckle pattern produced by radiation of a first frequency reflected from the object;

(b) receiving a second speckle pattern produced by radiation of a second frequency reflected from the object; and (c) determining the differences between the second speckle pattern and the first speckle pattern.

2. The method of claim 1 further comprising the steps of:

illuminating the object with radiation of a first wavelength before step (a); and illuminating the object with radiation of a second frequency before step (b).

3. The method of claim 2 wherein said illumination steps occur simultaneously.

4. The method of claim 2 wherein steps (a) and (b) occur simultaneously.

5. The method of claim 1 wherein steps (a) and (b) occur simultaneously.

6. The method of claim 1 wherein step (c) comprises cross-correlating the second speckle pattern and the first speckle pattern.

7. The method of claim 1 wherein step (c) comprises determining the direction the second speckle pattern has shifted from the first speckle pattern.

8. The method of claim 1 wherein step (c) further comprises determining the direction the second speckle pattern has shifted from the first speckle pattern and the magnitude of the shift.

9. An apparatus for remotely sensing the orientation of an object comprising:

a speckle pattern receiver which receives a first speckle pattern corresponding to radiation of a first frequency reflected from the object and a second speckle pattern corresponding to radiation of a second frequency reflected from the object; and a processor in electrical communication with said speckle pattern receiver, said processor comparing the second speckle pattern to the first speckle pattern to determine the differences between for the second speckle pattern and the first speckle pattern.

10. The apparatus of claim 9 further comprising a radiation source illuminating the object with radiation at a first frequency and a second frequency.

11. The apparatus of claim 10 wherein said radiation source comprises a laser capable of operating at more than one frequency.

12. The apparatus of claim 9 further comprising a first radiation source illuminating the object with radiation at a first frequency and a second radiation source illuminating the object with radiation at a second frequency.

13. The apparatus of claim 9 wherein said speckle pattern receiver is a charge coupled device.

14. The apparatus of claim 9 wherein said processor cross-correlates said first speckle pattern and said second speckle pattern.

15. The apparatus of claim 9 wherein said processor compares the second speckle pattern to the first speckle pattern to determine the direction the second speckle pattern has shifted from the first speckle pattern and the magnitude of the shift.

16. The apparatus of claim 9 further comprising a lens between said speckle pattern receiver and the object.

17. The apparatus of claim 16 wherein said speckle pattern receiver and said lens are spaced apart by a distance equal to the focal length of said lens.

18. An apparatus for remotely sensing the orientation of an object, the apparatus comprising:

a radiation source alternately illuminating the object with radiation at a first frequency and a second frequency;

a speckle pattern receiver which receives a first speckle pattern corresponding to radiation of said first frequency reflected from the object and a second speckle pattern corresponding to radiation of said second frequency reflected from the object; and a processor in electrical communication with said speckle pattern receiver, said processor comparing the second speckle pattern to the first speckle pattern in order to determine the direction the second speckle pattern has shifted from the first speckle pattern and the magnitude of the shift.

19. The apparatus of claim 18 further comprising a lens between said speckle pattern receiver and the object, said speckle pattern receiver and said lens spaced apart by a distance equal to the focal length of said lens.

* * * * *